Nov. 12, 1968  F. W. MARTIN  3,410,674

PROCESS FOR PRODUCING SEALS

Filed Oct. 27, 1964

INVENTOR.
FRANCIS W. MARTIN

BY

ATTORNEYS.

United States Patent Office 3,410,674
Patented Nov. 12, 1968

3,410,674
PROCESS FOR PRODUCING SEALS
Francis W. Martin, Painted Post, N.Y., assignor to Corning Glass Works, Corning, N.Y., a corporation of New York
Filed Oct. 27, 1964, Ser. No. 406,683
6 Claims. (Cl. 65—33)

ABSTRACT OF THE DISCLOSURE

A method of forming a seal by placing a devitrified glass having up to 40% by volume in the crystalline phase in contact with a body to form an assembly and heating said assembly to a temperature below the devitrification temperature of the glass for a time and under sufficient pressure to bond said devitrified layer to the body.

---

Figure 1:
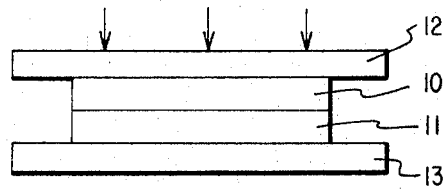

The present invention relates to a new method for producing seals.

As presently used, the term "seal" includes a body of material bonding together pre-formed parts as well as a layer of material adherently bonded to at least a portion of a single pre-formed surface.

Ceramics, glasses and metals having low thermal coefficients of expansion are now widely used in industry. As a result, considerable attention has been given to the development of efficient methods for forming seals with such materials. At the same time, a sealing procedure has been sought which does not require the application of high temperatures, so that articles in the environment of the sealing surface are protected from thermal damage.

Accordingly, an object of the present invention is to provide an efficient process for forming seals and especially forming seals with materials having low thermal coefficients of expansion. A further object of the invention is to provide a sealing method which can be accomplished with relatively little heating of the sealing surface.

According to the present invention, it has been found that very effective seals may be formed by the use of a preliminarily devitrified body of sealing glass. The process of this invention generally comprises devitrifying a body of thermally devitrifiable sealing glass, placing the devitrified sealing glass in contact with the surface to which it is to be bonded or sealed and then applying heat and pressure to bond the devitrified sealing glass to the surface. It has been found that such seals can be formed at temperatures well below the original curing temperature of the sealing glass and in very short times.

The process is particularly suitable for forming seals between materials having low thermal coefficients of expansion. The process has also been found to be very useful in producing seals at relatively low temperatures, thus avoiding thermal damage to the article being sealed or to other elements associated with the article being sealed.

The sealing glasses preferred for use in the present invention are thermally devitrifiable sealing glasses. These glasses are capable of forming a conventional fused vitreous seal and are also capable of undergoing a thermally induced, internally nucleated-type of crystallization whereby the glass separates into a glassy phase and a crystalline phase. The crystalline phase is composed of fine crystals having a relatively uniform size and distribution. The devitrified body of sealing glass is characterized by essentially uniform physical properties which ordinarily differ from those of the parent glass. In particular, the devitrified body of sealing glass normally has a significantly lower thermal coefficient of expansion and higher viscosity than the parent glass.

Thermal coefficient of expansion is stated in units per degree centigrade whenever used in the present specification and claims, and is the average value over a selected temperature range. While the actual effective range is below the setting point of a glass, the usual practice is to state the average expansion coefficient over a temperature range of from 0° to 300° C., there usually being no more than a small difference in values, e.g., 15%. Therefore, unless otherwise stated, the coefficient over such range is intended.

The thermally devitrifiable sealing glasses which may be used in the present invention differ from common opacifiable glasses both in the amount and nature of crystalline material produced upon devitrification and in the effect of devitrification on the physical properties and characteristics of the glass. The crystal particles in an opal glass normally comprises no more than about 5% of the glass and create no substantial change in the phyiscal characteristics of the glass, other than its light transmission.

Thermal devitrification of the present glasses on the other hand results in the separation of a substantial uniformly dispersed crystalline phase, up to about 40% by volume of the glass, attended by significant changes in the expansion coefficient and viscosity of the glass.

In general, the thermally devitrifiable glasses for use in the process of the present invention are of a type which upon thermal treatment are converted to the crystalline state to the extent that up to about 40% by volume of the glass enters the crystalline phase. The remaining glassy phase, at least about 60% by volume, is sufficient to form a normal fusion bond or seal with the sealing surface under pressure at temperatures well below the original curing temperature of the glass.

After devitrification, the sealing glasses of the present invention may be bonded or sealed to materials having coefficients of thermal expansion of about $80 \times 10^{-7}$ or below and preferably in the range of from about 30 to $70 \times 10^{-7}$. The devitrified glass should be matched to a material having a similar coefficient of expansion.

Some suitable glasses for producing seals in accordance with the present invention include those of the type described in my co-pending patent application (1939–C), filed Oct. 2, 1964, and entitled, "Sealing Glasses and Method."

These are a family of lead borosilicate glasses containing titania as an essential ingredient and other oxides as optional ingredients. Such glasses undergo marked decreases in thermal coefficient of expansion as they are crystallized or devitrified. The devitrified glasses are compatible with sealing surfaces having thermal coefficients of expansion of about $80 \times 10^{-7}$ or below.

These glasses comprise, by weight on an oxide basis, from about 60% to 80% PbO, from 5% to 18% $TiO_2$, at least 1% $B_2O_3$ and at least 5% $SiO_2$, the total of $B_2O_3$ and $SiO_2$ being from 10% to 20%. In addition, the glasses my optionally comprise from a trace up to 20% of at least one divalent metal oxide selected from the group consisting of BaO and ZnO, the total of the divalent metal oxides, including PbO, being from 60% to 80%.

Especially suitable sealing glasses for use in the present process are glasses of the foregoing composition containing from about 10% to 13% of $TiO_2$. Glasses of the present type containing relatively small amounts of $TiO_2$, from about 5% to 10%, are not as satisfactory for producing seals according to the present method as are those containing from 10% to 13% of $TiO_2$.

Having described the invention in general, it is believed that the following detailed description of the process and specific examples will contribute to a more complete understanding of the invention. Likewise, the accompanying drawing which depicts certain illustrative applications of the process will also further an appreciation of the invention.

Figure 2:
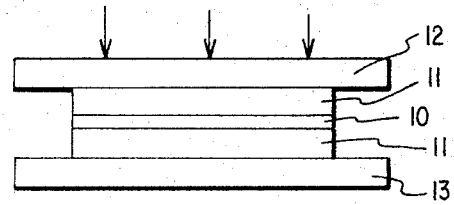
Figure 3:
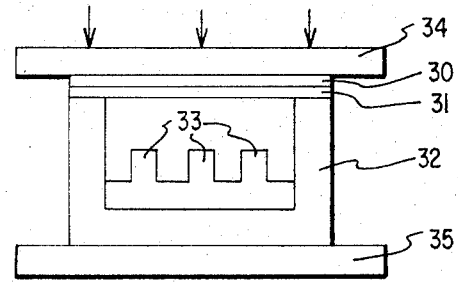

In the drawing:

FIGURE 1 is a side, cross-sectional, edge view of sealing with a single pre-formed body, FIGURE 2 is a side, cross-sectional, edge view of the sealing with a plurality of pre-formed bodies, and FIGURE 3 is a side, cross-sectional view of the sealing of a housing by the present process.

In producing seals according to the present invention, a body of thermally devitrifiable sealing glass is first prepared.

Where a thermally devitrifiable sealing glass of the type described in my previously identified co-pending application is employed, the glass is melted in the conventional manner. Ordinary batch materials, such as red lead, boric acid, pulverized sand and titania are mixed in suitable amounts calculated to produce a glass of desired composition and are melted in a platinum crucible or small continuous melting unit at temperatures on the order of from 1200° to 1300° C., until a suitably homogenized melt is obtained. After proper homogenization, the molten glass is preferably quenched by running a stream into cold water or between cold metal rollers to avoid premature crystallization within any part of the glass. The glass is then dried and ground to a suitable size.

The glass is then formed into the desired shape and is heated to cause the glass to fuse and to devitrify to the extent that up to about 40% by volume of the glass is converted to the crystalline phase.

In the process of preliminary devitrification, the ground glass may be applied as a slip to the surface of a pre-formed support and then heated in situ to form a seal in the nature of a glaze on the surface of the support. The glass is then further heated to bring about the desired devitrification. Alternatively, the glass may be molded in the form of gaskets, beads, strips or other shapes adapted to making seals of particular configuration and is then heated to accomplish fusion and devitrification.

The present glasses may be fused or cured and devitrified by the heating at various temperatures and for various times, but fusion and devitrification may ordinarily be accomplished by heating the glass at a temperature in the range of from 500° to 700° C., and usually about 600° C., for times varying up to about one hour.

As previously noted, it has been found that glasses suitable for use in the present process must contain at least about 60% by volume of the glass in the vitreous or glassy state, after thermal devitrification. Otherwise, the body of sealing glass will not retain the ability to form a good seal to another pre-formed article upon the application of heat and pressure. Not all thermally devitrifiable glasses are suitable for the present process, but those which are satisfactory can be identified by subjecting the glass to thermal devitrification and then subjecting sections of the glass to examination by electron microscope to determine the extent of devitrification. Of course, the extent of devitrification need not and will not be up to 40% by volume in all cases. To gain the benefits of the invention, devitrification need only take place to the extent that there is a substantial decrease in the thermal coefficient of expansion of the sealing glass so that it may be matched with and bonded to low expansion materials, such as alumina, Kovar metal, Kovar sealing glasses, and other low expansion glasses.

After the formation and devitrification of the body of sealing glass has been completed, the devitrified body of sealing glass is placed in contact with one or more pre-formed articles which are to be bonded or sealed. The assembly of the preliminarily devitrified body of sealing glass with the pre-formed article or articles is then subjected to heat and pressure to produce the desired seal.

The amount of heat and pressure and the duration of the treatment required to effect a good seal will vary and these conditions are dependent on several factors. For example, the configuration of the seal and the condition of the sealing surfaces will affect the requirements for good sealing. To illustrate, optically flat surfaces will seal more easily than will rough or irregular surfaces. Also, the extent of devitrification will influence the sealing conditions. Where about 40% by volume of the sealing glass has been converted to the crystalline phase, relatively higher temperatures and pressures may be required than with glasses of lower crystal content, after devitrification. Conversely, the larger the proportion of the glassy or vitreous phase of the glass, the more easily will sealing be accomplished. In general, however, sealing may be achieved by heating the body of devitrified sealing glass to a temperature well below the original curing temperature of the glass, usually about 600° C., and contacting the sealing glass with a preformed body for a few seconds or more under pressure. For more highly devitrified sealing glasses, fairly heavy loading may have to be applied for longer periods of time, but the sealing temperature need not exceed about 600° C. In most cases, a pressure of several lbs./sq. in. will suffice, but heavier loading may be used where needed or desired to speed the bonding.

Referring now to the accompanying drawing and specifically to FIG. 1, it will be seen that in accordance with the invention a sheet of thermally devitrifiable sealing glass 10 may be bonded to a pre-formed body 11 by first subjecting the glass 10 to thermal treatment to devitrify the glass to the extent that up to about 40% by volume of glass 10 is converted to the crystalline phase. The devitrified sheet of sealing glass 10 is then placed in contact with at least a portion of the surface of pre-formed body 11 and the assembly of 10 and 11 is subjected to heat and pressure to complete the seal. The pressure may be applied by inserting the assembly between platens 12 and 13 and exerting the required pressure. Heat may be furnished by utilizing platens which are heated by induction or other means. Alternatively, the pressing operation may be conducted in a furnace maintained at the desired temperature.

As will be seen in FIG. 2, a sheet of devitrified sealing glass may be employed to seal a plurality of pre-formed sheets 11. In this case, sheet 10 may be a self-supporting element inserted and sealed between pre-formed sheets 11 or it may first be formed as a layer on the surface of on of the pre-formed sheets 11 and then pressure bonded to the other pre-formed body.

Pre-formed bodies 11 may be formed of any suitable material capable of being bonded to the devitrified body of sealing glass 10. Suitable materials include low expansion glasses, ceramics, refractory metals and alloys, and the like.

In addition to low expansion materials having a good expansion match with the body of devitrified sealing glass, seals may also be made to ductile metals, such as aluminum, copper or platinum.

It will be obvious that the body 10 of devitrified sealing glass may be provided in any number of shapes to suit the required seal configuration. Likewise, the shape of the pre-formed bodies 11 is not critical to the invention, but will be dictated by the nature of the end product.

It should also be noted that a body of devitrified sealing glass formed in accordance with the present invention may be bonded to another like body of devitrified sealing glass as well as to other diverse materials.

In one embodiment of the present invention, as illustrated in FIG. 3, the process may be employed to form a closure on a housing or other structure formed from a low expansion material. In this case, a supporting sheet 30 of ductile metal is coated with a frit of thermally devitrifiable sealing glass of the type previously described. The frit is then thermally cured to produce a devitrified layer 31 in the nature of a glaze which is tenaciously bonded to the surface of sheet 30.

The composite sheet is then placed over the mouth or aperture in housing 32 which may contain heat sensitive components 33, such as electronic devices or the like. Devitrified sealing layer 31 is placed in contact with the surface of housing 32 which is formed of a low expansion material having a good expansion match with layer 31. The assembly is then subjected to pressure between platens 34 and 35 and is heated to bond layer 31 to housing 32, thereby sealing the housing. In this case, heat may be supplied through upper platen 34 while lower platen 35 may be a heat sink to prevent undue heating of housing 32 or components 33.

Example 1

A glass of the following composition is melted and ground according to standard practice: 68% PbO, 12% $TiO_2$, 7.5% $B_2O_3$, 7.5% $SiO_2$ and 5% ZnO.

The glass is then molded into the form of a flat sheet and is fired at 620° C. for 30 minutes to cure and devitrify the glass. The devitrified body of sealing glass is then assembled in surface contact with a pre-formed body of hard, low expansion borosilicate glass having the following approximate analysis: 67% $SiO_2$, 15% $B_2O_3$, 7.5% $Al_2O_3$, 2.5% $Na_2O$, 3.5% $K_2O$, 5% $Li_2O$ and 3% BaO.

The assembly is then heated to a temperature of about 525° C. and is subjected to a pressure of about 10 lbs./sq. in. for a few seconds. After cooling, a firm bond between the bodies of glass is found to have been formed.

Example 2

The process of Example 1 is repeated, but the devitrified body of sealing glass is instead bonded to a pre-formed body of Kovar metal.

Example 3

A glass of the following composition is melted and ground according to standard practice: 63% PbO, 12% $TiO_2$, 7.5% $B_2O_3$, 7.5% $SiO_2$ and 10% ZnO.

The ground glass is mixed with water and is applied as a coating on the surface of a thin sheet of aluminum foil having a thickness of about 3 mils. The coating is dried and is fired at about 620° C. for 30 minutes, forming a devitrified glaze on the surface of the aluminum foil. The glaze is then assembled in surface contact with a body of hard, borosilicate glass as described in Example 1. The assembly is then heated to a temperature of about 525° C. and is subjected to a pressure of about 8 lbs./sq. in. for a few seconds. A strong bond between the body of devitrified sealing glass and the borosilicate glass is found to have been formed.

Example 4

The procedure of Example 3 is repeated rising the sealing glass of Example 1.

While the present invention has been described and illustrated with respect to certain preferred embodiments, it will be obvious to one skilled in the art that the conditions of the process may be modified and the materials employed may be varied without departing from the scope of the invention as expressed in the following claims.

What is claimed is:

1. A method of producing a sealed article comprising:
   (a) heating a thermally devitrifiable glass for a sufficient time to form a devitrified member which contains up to about 40% by volume in the crystalline phase, said glass having a composition consisting essentially in weight percent on the oxide basis as calculated from the batch of:

| | Percent |
   |---|---|
   | PbO | 60–80 |
   | $TiO_2$ | 5–18 |
   | $B_2O_3$ | at least 1 |
   | $SiO_2$ | at least 5 | the total of $B_2O_3$ and $SiO_2$ being from 10–20%;
   (b) placing said devitrified member in contact with at least one preformed body of a material having a thermal coefficient of expansion in the range of $30–70 \times 10^{-7}$ per degree C., to form an assembly; and
   (c) applying heat to a temperature in the order of from about 500° C. to about 700° C. and for a time below that at which said glass is devitrified, and sufficient pressure to said assembly to bond said devitrified member to said at least one preformed body.

2. The method of claim 1 wherein said thermally devitrifiable sealing glass comprises a glass of the following composition in percent by weight on an oxide basis: from 60% to 80% PbO, from 5% to 18% $TiO_2$, at least 1% $B_2O_3$, at least 5% $SiO_2$, the total of $B_2O_3$ plus $SiO_2$ being from 10% to 20%, and from a trace to 20% of a divalent metal oxide selected from the group consisting of BaO and ZnO, the total of divalent metal oxides, including PbO, being from 60% to 80%.

3. A method for producing a seal comprising:
   (a) forming a glaze of a thermally devitrifiable sealing glass on the surface of a first preformed body, said glass having a composition consisting essentially in weight percent on the oxide basis as calculated from the batch of:

| | Percent |
   |---|---|
   | PbO | 60–80 |
   | $TiO_2$ | 5–18 |
   | $B_2O_3$ | at least 1 |
   | $SiO_2$ | at least 5 | the total of $B_2O_3$ and $SiO_2$ being from 10–20%;
   (b) heating said glaze for a sufficient time to form a devitrified glaze on the surface of said first preformed body which contains up to about 40% by volume in the crystalline phase;
   (c) placing said devitrified glaze in contact with the surface of a second preformed body of a material having a thermal coefficient of expansion in the range of $30–70 \times 10^{-7}$ per degree C., to form an assembly; and
   (d) applying heat to a temperature in the order of from about 500° to about 700° C. and for a time below that at which said glaze is devitrified, and sufficient pressure to said assembly to bond said devitrified glaze to said second preformed body.

4. A method of producing a seal comprising:
   (a) applying to the surface of a ductile metal a coating of a thermally devitrifiable sealing glass having a composition consisting essentially in weight percent on the oxide basis as calculated from the batch of:

| | Percent |
   |---|---|
   | PbO | 60–80 |
   | $TiO_2$ | 5–18 |
   | $B_2O_3$ | at least 1 |
   | $SiO_2$ | at least 5 | the total of $B_2O_3$ and $SiO_2$ being from 10–20%;
   (b) heating said coating for a sufficient time to form a devitrified layer of sealing glass on the surface of said ductile metal which contains up to about 40% by volume in the crystalline phase;
   (c) placing said devitrified sealing glass in contact with the surface of a preformed body of a material having a thermal coefficient of expansion in the range of $30–70 \times 10^{-7}$ per degree C., to form an assembly; and
   (d) applying heat to a temperature in the order of from about 500° C. to about 700° C., and for a time below that at which said sealing glass is devitrified, and sufficient pressure to said assembly to bond said devitrified layer of sealing glass to said preformed body.

5. The method of claim 4 wherein said ductile metal is aluminum.

6. The method of claim 4 where in said pre-formed body is a hard, borosilicate glass.

(References on following page)

References Cited

UNITED STATES PATENTS

| | | | |
|---|---|---|---|
| 2,889,952 | 6/1959 | Claypoole | 65—33 X |
| 3,061,664 | 10/1962 | Kegg | 65—33 |
| 3,110,619 | 11/1963 | Koenig et al. | 65 |
| 3,269,818 | 8/1966 | Tiede | 65—43 |
| 3,295,944 | 1/1967 | Baak | 65—33 |
| 3,011,673 | 12/1961 | Van Zee | 65—43 XR |
| 3,208,892 | 9/1965 | Miller et al. | 117—125 XR |
| 3,281,309 | 10/1966 | Ross | 65—43 XR |
| 3,346,357 | 10/1967 | Baak | 65—33 |

DONALL H. SYLVESTER, *Primary Examiner.*

F. W. MIGA, *Assistant Examiner.*